United States Patent [19]

Nambu et al.

[11] 4,101,635
[45] Jul. 18, 1978

[54] METHOD FOR REGENERATING AND RECYCLING CATALYST FOR OXIDATION OF SULFUR DIOXIDE

[75] Inventors: Masao Nambu; Syunichi Yamamoto, both of Kawasaki; Yoshihisa Koiwai, Yokohama, all of Japan

[73] Assignee: Nippon Oil Company Ltd., Tokyo, Japan

[21] Appl. No.: 772,951

[22] Filed: Feb. 28, 1977

Related U.S. Application Data

[63] Continuation of Ser. No. 504,746, Sep. 10, 1974, abandoned.

[30] Foreign Application Priority Data

Sep. 14, 1973 [JP] Japan .................................. 48-103242
Oct. 5, 1973 [JP] Japan .................................. 48-111538
Aug. 27, 1974 [JP] Japan .................................. 49-97487

[51] Int. Cl.$^2$ ...................... C01B 17/00; C01F 11/46
[52] U.S. Cl. .................................. 423/242; 252/416; 423/166; 423/555; 423/522
[58] Field of Search ............... 423/166, 242, 522, 555; 252/416

[56] References Cited

U.S. PATENT DOCUMENTS

| | | | |
|---|---|---|---|
| 2,021,936 | 11/1935 | Johnstone | 423/242 |
| 2,090,142 | 8/1937 | Nonheb et al. | 423/242 |
| 2,113,198 | 4/1938 | Nonheb et al. | 423/242 |
| 3,836,630 | 9/1974 | Noguchi et al. | 423/166 |
| 3,914,387 | 10/1975 | Von Jordan et al. | 423/242 |
| 3,947,560 | 3/1976 | Nambu et al. | 423/522 |

*Primary Examiner*—O. R. Vertiz
*Assistant Examiner*—Gary P. Straub
*Attorney, Agent, or Firm*—Sherman & Shalloway

[57] ABSTRACT

In a method for oxidizing sulfur dioxide by contacting a sulfur dioxide-containing gas and an oxygen-containing gas with an aqueous solution containing pentavalent vanadium and divalent manganese as a catalyst, the method for regenerating and recycling the oxidation catalyst which comprises adding at least one calcium compound selected from the group consisting of calcium oxide, calcium hydroxide and calcium carbonate and an oxygen-containing gas as an oxidizing agent to at least a part of the aqueous solution catalyst used in the oxidation reaction, separating the resulting gypsum, and recycling the recovered aqueous solution catalyst for use in the oxidation of sulfur dioxide.

10 Claims, No Drawings

METHOD FOR REGENERATING AND RECYCLING CATALYST FOR OXIDATION OF SULFUR DIOXIDE

This is a continuation of application Ser. No. 504,746, filed Sept. 10, 1974 and now abandoned.

This invention relates to a method for desulfurizing flue gases resulting from the combustion of sulfur, hydrogen sulfide, heavy oil, coal, tail gases from a sulfur manufacturing apparatus, etc., sintering gases in steel-making factories, and tail gases from a sulfuric acid manufacturing apparatus, and more specifically, to a method which comprises separating sulfur dioxide from these sulfur dioxide-containing gases and converting it finally to gypsum via sulfuric acid by air oxidation, wherein a catalyst for the oxidation of sulfur dioxide is used repeatedly without causing a reduction in activity.

It has already been well known that gypsum is produced by adding a calcium compound to sulfuric acid obtained by air oxidation of sulfur dioxide. In order to air oxidize sulfur dioxide, a high temperature gaseous phase method using a vanadium catalyst has been widely utilized in a sulfuric acid manufacturing factory. This catalyst, however, has poor activity at low temperatures, and must be used at a temperature of as high as 450 to 500° C. in order to exhibit feasible activities. In this method, the equilibrium conversion of sulfur dioxide is only 80 to 98% at most, and an unreacted exhaust gas having a sulfur dioxide concentration of as high as 3000 ppm is frequently discharged, because the oxidation reaction of sulfur dioxide is thermodynamically restricted at high temperatures. In order to oxidize sulfur dioxide at a relatively low temperature of about 50° C. at which the reaction is not thermodynamically restricted, attempts were made to use activated carbon as a catalyst. In these attempts, however, most of the resulting sulfuric acid is firmly absorbed to the activated carbon, and consequently impedes the proceeding of the oxidation reaction of sulfur dioxide. Hence, it is impossible to use this catalyst continuously for long periods of time, and one must resort, for instance, to a method in which activated carbon used for half a day is washed with water for long periods of time before re-use. This extra step, of course, adds to the cost of production.

Aqueous solutions of ferrous or ferric sulfate have been known since the end of the last century as a catalyst for oxidizing sulffur dioxide. This catalyst, however, has poor activity unless the iron concentration is increased. It was found at the beginning of this century that fairly feasible activity can be obtained if the iron concentration is increased to 1,000 ppm or 1.7% by weight and the catalyst is used at a temperature above 40° C. Since then, research and development efforts have been made to use this catalyst for desulfurizing of exhaust smokes. It has been pointed out, however, that in such a method, too, sulfuric acid is formed and accumulated in the catalyst solution and impedes the oxidation reaction.

On the other hand, attempts have also been made from old to convert sulfuric acid to gypsum by adding calcium salts to at least a part of the catalyst solution and thus remove the sulfuric acid. However, these attempts can neither be free from the disavantages that the catalyst activity is poor unless the sulfuric acid concentration of the recycle catalyst solution is maintained considerably low, that the iron catalyst tends to be precipitated and mixed in the gypsum in the gypsum-forming step, and that tin, thiocyanogen, and cyanogen, etc. become a violent catalyst poison.

Manganese salts (manganese sulfate) catalysts known from old like the iron salts are also very susceptible to poisoning by tiny amounts of copper, phenol, molybdenum, phosphorus, thiocyanogen, cyanogen, tin, etc.

In U.S. patent application Ser. No. 448,256 filed on Mar. 5, 1974 now U.S. Pat. No. 3,947,560, the inventors of the present application disclosed that by using a catalyst composed of an aqueous solution containing both pentavalent vanadium and divalent manganese, the difficulties of the conventional techniques can be avoided, and sulfur dioxide can be rapidly converted to sulfuric acid. This prior application states, however, that even in this case, the resulting sulfuric acid cannot be accumulated unlimitedly in the catalyst solution, but by adding a calcium salt to at least a part of the catalyst solution and separating the resulting gypsum and simultaneously recovering the mother liquor, the catalyst can be recovered in the form dissolved in the mother liquor and therefore, this mother liquor can be recycled to the air oxidation of sulfur dioxide.

The inventors, however, found that when this catalyst solution is used continuously for long periods of time, it cannot be free from a gradual reduction in activity. It is true that there is no appreciable reduction in activity over the period of 50 hours when treating 1,000 m³ in total, for example, of a sulfur dioxide-containing gas (1,020 ppm of sulfur dioxide) per kiloliter of the catalyst solution (24 ppm of pentavalent vanadium, 21 ppm of divalent manganese, and 6% by weight of sulfuric acid), and 95 to 97% of sulfur dioxide can be converted to sulfur, and finally to gypsum. However, when the amount of the gas treated reaches 2,300 to 3,000 m³ in total, the conversion of sulfur dioxide is reduced to 93%, and by treating 3,000 m³ of the gas, the conversion of sulfur dioxide after a total period of 350 hours is reduced to 86%. The cause of this catalyst deterioration has not yet been made clear, and it is difficult to know its details because the speed of deterioration varies complicatedly according to various factors such as the composition of impurities in the sulfur dioxide-containing gas, the composition of the catalyst solution, or the reaction temperature.

As a result of studying the deterioration of catalyst, we have now found that this deteriorating phenomenon is closely related to the reduction, although very slow one, of the pentavalent vanadium in a pentavalent vanadium/divalent manganese catalyst solution to tetravalent vanadium for some reason or other, and that the activity of the catalyst solution can be retained semi-permanently by oxidizing at least a part of the tetravalent vanadium to maintain the concentration of pentavalent vanadium in the recycle catalyst solution always at 3 ppm or more.

On the basis of the above discovery, tetravalent vanadium contained in the deteriorated catalyst solution can be electrolytically oxidized, or oxidized with a known oxidizing agent such as potassium permanganate, potassium bichromate, cerium sulfate, chlorine or ammonium persulfate in order to maintain the activity of the pentavalent vanadium/divalent manganese composite catalyst system. However, these methods are expensive. The method using an oxidizing agent suffers from the disadvantage that potassium, manganese, chromium, cerium, chlorine, ammonium salts, etc. derived from the oxidizing agent are accumulated unwantedly in the catalyst solution and mix in the gypsum as impurities in the subsequent gypsum manufacturing step. On the other hand, a method could also be employed to oxidize tetravalent vanadium with air. But this method is extremely uneconomical because of the need to separate the vanadium from the catalyst solution and heat it vigorously, and can be never be performed on a commercial scale.

It is an object of this invention to provide a new method whereby to recycle and use a pentavalent vanadium/divalent manganese composite catalyst solution repeatedly for long periods of time by a simple and cheap procedure.

According to this invention, there is provided a method for oxidizing sulfur dioxide by contacting a sulfur dioxide-containing gas and an oxygen-containing gas with an aqueous solution containing both pentavalent vanadium and divalent manganese as a catalyst, characterized by adding at least one calcium compound selected from the group consisting of calcium oxide, calcium hydroxide and calcium carbonate and an oxygen-containing gas as an oxidizing agent to at least a part of the aqueous solution catalyst used in the oxidation, separating the resulting gypsum, and recycling the catalyst solution so recovered for use as the oxidation catalyst for sulfur dioxide.

The critical feature of the present invention is that the activity of the catalyst solution is regenerated by adding the calcium compound and the oxidizing agent to the catalyst solution of reduced activity.

We have ascertained that by adding only the calcium compound to the deteriorated catalyst, sulfuric acid in the catalyst solution can be neutralized, but tetravalent vanadium cannot be oxidized to pentavalent vanadium, and that by adding only the oxygen-containing gas to the deteriorated catalyst, tetravalent vanadium in the catalyst solution cannot be oxidized to pentavalent vanadium, thus failing to achieve the object of this invention. Despite this fact, when at least one of quick lime (calcium oxide), slaked lime (calcium hydroxide) and limestone (calcium carbonate) and the oxygen-containing gas are caused to act on the deteriorated catalyst solution, tetravalent vanadium in the catalyst solution can be easily oxidized to pentavalent vanadium, and thus, the deterioration of the catalyst can be completely prevented.

One example of a catalyst solution to which the calcium compound and the oxidizing agent are added in accordance with this invention is a pentavalent vanadium/divalent manganese catalyst solution which has been used in the air oxidation of sulfur dioxide. Specifically, as disclosed in our prior application mentioned above, a sulfur dioxide-containing gas and an oxygen-containing gas are contacted with an aqueous solution containing manganese in a concentration of 3 to 200 ppm and pentavalent vanadium in a concentration of 3 to 8,000 to oxidize sulfur dioxide to sulfuric acid. Then, in accordance with the present invention, at least a part of the catalyst solution used in this oxidation reaction is taken out, and the calcium compound and the oxidizing agent are added to it. As a result, the concentration of pentavalent vanadium of the catalyst solution is increased. The catalyst solution is returned to the sulfur dioxide oxidation reaction system and the concentration of pentavalent vanadium is maintained at 3 ppm or more. In this way, the activity of the catalyst solution can be retained over long periods of time.

Where the unreacted sulfur dioxide remains in the catalyst solution to which the method of this invention is to be applied, the calcium compound is consumed by this sulfur dioxide to form calcium sulfite as a by-product which undesirably mixes in gypsum as an impurity. This, however, is not deterimental to the regeneration of the catalyst which is intended by this invention.

In the present invention, the calcium compound and the oxygen-containing gas are caused to act on the catalyst solution by, for example, (1) first adding the calcium compound to the catalyst solution and then introducing the oxygen-containing gas, or (2) adding the oxygen-containing gas and the calcium compound to the solution at the same time. It is also possible to subject the catalyst solution to the action of the calcium compound and the oxygen-containing gas alternately.

In the method (1) mentioned above, it is preferred to add the calcium compound until the pH of the solution exceeds at least 7.0, and then add oxygen-containing gas in an amount corresponding to at least 40 mol% of the tetravalent vanadium to be oxidized. It is more preferred that the solution is contacted with 200 to 400 mol%, based on the tetravalent vanadium, of oxygen for at least one minute, preferably 5 to 25 minutes.

In the method (2) mentioned above, it is preferred to add the calcium compound and the oxygen-containing gas in amounts sufficient to adjust the pH value of the catalyst solution to at least 2. It is desirable that the calcium compound is added for at least 1 minute, preferably over the period of 5 to 25 minutes while introducing at least 40 mol%, preferably 200 to 400 mol%, based on the tetravalent vanadium to be oxidized, of oxygen for at least 1 minute, preferably for 5 to 25 minutes, thereby to maintain the pH of the solution at 2 or more.

In the various methods exemplified above, the calcium compound is added desirably in such a way that the pH of the catalyst solution comes within the prescribed range. The object of this invention can be achieved even if larger amounts of the calcium compound are added. However, if the amount is too large as to increase the pH of the catalyst solution beyond 7, unwanted calcium salts mix in the catalyst solution and become impurities in the resulting gypsum. Thus, it is not particularly preferable.

The activity of the catalyst can be retained effectively by adding the oxygen-containing gas in the amount specified above. Even if they are added in excess, it does not impede the present invention. It is not necessary to oxidize all the tetravalent vanadium in the catalyst solution always to pentavalent vanadium. The amount of the oxygen-containing gas can be properly reduced so that the concentration of pentavalent vanadium in the catalyst solution is maintained at 3 ppm or more according to the conversion sufficient to maintain the desired catalyst activity.

The calcium compound that can be used includes quick lime (calcium oxide), slaked lime (calcium hydroxide) or limestone (calcium carbonate), or mixtures of these. Strontium carbonate, strontium oxide, barium oxide, barium hydroxide or barium carbonate can be used instead of the calcium salt, but the calcium salt has the advantage that it is available at low cost and gives gypsum of high utilitarian value. Where it is desired to form strontium sulfate or barium sulfate instead of gypsum, the above-mentioned strontium or barium salt can be used.

As the oxygen-containing gas used as an oxidizing agent, not only pure oxygen, but also ordinary air can be used, but the use of air is most preferred.

The oxidation treatment of the catalyst solution by the calcium compound and the oxygen-containing gas can be carried out at room temperature, but it is effective to perform the oxidation usually at a temperature of 0° to 100° C., preferably 10° to 80° C.

The deterioration of a pentavalent vanadium/divalent manganese composite catalyst in the oxidation of sulfur dioxide, as stated previously, is considered to be due mainly to the reduction of pentavalent vanadium to tetravalent vanadium. Accordingly, the activity of the catalyst can be maintained by making up for the decreased pentavalent vanadium so that pentavalent vanadium is present in the catalyst solution in an amount sufficient to maintain the catalyst activity. In view of the fact that the minimum amount of pentavalent vanadium required to maintain the catalytic activity is as small as about 3 ppm and the speed of the decrease of pentavalent vnadium during use is generally very low, it is not necessary to subject all of the recycle catalyst solution to the catalyst regenerating treatment in accordance with this invention, but the activity of the catalyst solution can be maintained by taking out only a part of the recycle catalyst solution, treating it by the method of this invention, and then returning it to the recycle catalyst solution. As already stated above, various factors effect the rate of deterioration of the catalyst, but of these, the effect of the reaction temperature in the oxidation of sulfur dioxide is most dominant, and the rate of deterioration increases with higher reaction temperatures. Generally, when the reaction temperature is 20° to 35° C., the lifetime of the catalyst is fairly long, and no complicated regeneration procedure is required. For example, by continuously regenerating about 1/150 to 1/200 of the recycle catalyst solution, the catalyst solution can be repeatedly used over long periods of time. If, however, the reaction temperature rises above 40° C., especially above 45° C., the lifetime of the catalyst is considerably shortened, and regenerating about 1/150 to 1/200 of the recycle catalyst solution is not enough to maintain feasible catalyst activity. It is necessary to regenerate 2 to 4 times the above amount.

It is very desirable from an economic viewpoint to reduce the amount of the catalyst solution to be regenerated. We have now found that by incorporating at least 3 ppm of trivalent iron in the recycle catalyst solution, the amount of the catalyst solution to be treated in accordance with this invention can be drastically reduced. The trivalent iron contained in the catalyst solution in this embodiment is considered to contribute scarcely to the activity of the catalyst in the oxidation reaction because as far as the initial activity is concerned, a three-component catalyst of vanadium pentavalent-divalent manganese-trivalent iron only has much the same catalyst activity as a two-component catalyst of pentavalent vanadium - divalent manganese. However, by incorporating the trivalent iron, the rate of deterioration of the catalyst becomes extremely low, and the amount of the catalyst solution to be treated by the method of this invention can be drastically reduced. Accordingly, in a very preferred embodiment of this invention, an aqueous solution containing pentavalent vanadium, divalent manganese and trivalent iron is subjected to the catalyst regenerating treatment of this invention, and the catalyst solution is recycled for further use.

In this embodiment, the effective concentration of trivalent iron to be present conjointly with vanadium and manganese is at least 3 ppm, and usually 150 to 200 ppm. Even if it is present in larger concentrations, for example, in a concentration of 300 ppm or 2000 ppm, no trouble will occur. But as compared with the addition of iron in a concentration of 150 to 200 ppm, there is no significant difference in the effect of addition, and thus no advantage is obtained. The amount of the catalyst solution to be regenerated depends upon the temperature at which the catalyst solution is used. If the temperature is not more than 40° C., the amount can be adjusted to not more than 1/150 to 1/200 of the recycle catalyst solution. At 45° to 55° C., the amount is about 1/150 to 1/200, and at a temperature of as high as 60° to 80° C., it can be about 1/150.

Sources of trivalent iron to be incorporated in the catalyst solution in this embodiment are ferric salts such as iron potassium alum, iron ammonium alum, ferric hydroxide, ferric nitrate, ferric oxide, ferric sulfate, ferric sulfide, ferric vanadate, ferric bichromate, ferric chromate, ferric benzoate, and ferric oxalate; ferrous salts such as ferrous hydroxide, ferrous nitrate, ferrous oxide, ferrous sulfate, ferrous sulfide, ferrous chloride, ferrous carbonate, ferrous sulfate, ferrous sulfite, ferrous phosphate, ferrous perchlorate, ferrous oxalate, ferrous formate, ferrous acetate, or ferrous ammonium sulfate; and metallic iron.

In order to cause iron to be present in the pentavalent vanadium-divalent manganese catalyst solution, a method can be employed in which pentavalent vanadium, divalent manganese, and the ferrous or ferric salt or both are added to water and mixed. In this case, the order of adding the vanadium, manganese and iron is optional. Or in a method, as described later in Examples, which comprises the steps of the absorption of sulfur dioxide by the recycle catalyst solution, the oxidation of sulfur dioxide, the regeneration of a part of the catalyst solution and the returning of the regenerated solution to the recycle catalyst solution, the ferric salt can be added to the catalyst solution at the end of the absorption step. The ferric salt can also be added to the catalyst solution after the end of the above oxidation step. Or the ferrous or ferric salt or metallic salt can be added to the catalyst solution prior to the catalyst regenerating step. Or it is also possible to add the ferric salt to the catalyst solution which has been subjected to the regneration operation.

In the embodiment of this invention in which a catalyst solution containing pentavalent vanadium, divalent manganese and trivalent iron is used, a part of the iron in the catalyst solution is lost as a result of being mixed in gypsum. In such a case, iron is supplied to the recycle catalyst solution by any of the above mentioned methods.

When performing the method of this invention, about 10% by weight of the catalyst solution adheres to the separated gypsum, and a part of the catalyst components, i.e., vanadium and manganese, is inevitably lost although in small amounts. Tiny amounts of the catalyst components adhering to the gypsum can be recovered by washing gypsum with a large quantity of water. However, this requires the provision of additional washing equipment, and increased operating cost. It is of course possible to make up for the pentavalent vanadium and divalent manganese corresponding to the catalyst loss by using reagents, that is, vanadium pentoxide and manganese sulfate. However, since the vanadium salt is very expensive, the supply of it in even a small amount gives rise to a significant increase in cost.

According to a preferred embodiment of this invention whereby the lost pentavalent vanadium and divalent manganese can be made up for at very low cost while avoiding such defects, soot is added to at least a part of the two-component catalyst solution containing pentavalent vanadium and divalent manganese (which may contain trivalent iron as an agent for maintaining the catalyst activity) prior to the oxidation reaction of sulfur dioxide.

The term "soot," as used in the present application, denotes soot which is released from the upper part of a flue when a fuel oil containing a distillation residual oil is burned, and a conbustion residue which results in the furnace or the bottom of the flue incident in the combustion of the fuel oil.

The term "oil containing a distillation residual oil," as used in this application, denotes an oil which contains crude petroleium naturally occuring tar, shale oil, tar sand, tar, or the residue of such oil resulting from the separation of a part or whole of volatile fractions by distillation or other means (for example, atmospheric residual oils resulting from distillation at atmospheric pressure, residual oils resulting from distillation at reduced pressure, or asphalt). This oil usually contains a substantial amount of asphaltene, and therefore, usually contains vanadium and manganese.

A greater part of vanadium contained in the soot can be easily extracted, but most of the vanadium extracted from the soot is in the tetravalent state. In the perfered embodiment of this invention in which soot is added in advance to at least a part of the recycle catalyst solution, tetravalent vanadium supplied from soot is converted to pentavalent vanadium by the regenerating treatment of this invention. Consequently, the lost pentavalent vanadium can be made up for without using any expensive reagent.

In order to add soot to the recycle catalyst solution, the soot can be directly mixed with the catalyst solution, or the soot can be contacted with the catalyst solution together with a gas containing sulfur dioxide. It is also possible to first contact the soot with an aqueous extracting solvent such as water or dilute sulfuric acid, and then mix the extract containing at last part of the extracted vanadium with the catalyst solution. The aqueous extracting solvent for extracting soot is preferably an inorganic or organic aqueous medium capable of extracting vanadium and manganese upon mixing with soot and/or the combustion residue, and of dissolving both the pentavalent vanadium and manganese in a concentration of at least 3 ppm. Examples of such an extracting solvent are water alone, or an aqueous solution of sodium hydroxide, potassium hydroxide, sulfuric acid, nitric acid, sulfurous acid, hydrochloric acid, ammonium chloride or an alcohol, or mixtures thereof. In view of the fact that the catalyst solution is used in this invention to convert sulfur dioxide to sulfuric acid, the use of water or dilute sulfuric acid as the aqueous extracting solvent is most preferred.

Naturally, the amount of soot required is largely affected by the type of the soot, especially its vanadium content, and therefore, cannot be unequivocally determined. The amount of the soot to be added to the catalyst solution is adjusted as desired so that vanadium can be supplied to the catalyst solution in an amount corresponding to the vanadium loss caused by adhesion to gypsum. The amount of vanadium supplied can be larger than the amount of vanadium lost. Even if the amount of supply is temporarily smaller than the amount of loss, no trouble occurs so long as the pentavalent vanadium is always present in a concentration of at least 3 ppm in the catalyst solution. There is neither any trouble even if substances present in the soot together with tetravalent vanadium, such as iron, nickel, silicon, aluminum, copper, lead, calcium, zinc, tin, magnesium, sodium, phosphorus, molybednum, tungsten, potassium, titanium, boron, barium, cobalt, strontium, chromium, antimony, arsnic, cadmium, bismuth, beryllium, pentavalent vanadium, cyanogen compounds, or thiocyanogen compounds, mix with the catalyst solution together with tetravalent vanadium. The soot contains manganese although in a small amount in the form of divalent manganese salt. Accordingly, this manganese comes into the catalyst solution together with tetravalent vanadium, and at least a part of the divalent manganese lost is necessarily replenished.

When soot is mixed with the catalyst solution, it is accumulated in the catalyst solution, but this does not at all prevent the make-up of pentavalent vanadium. As a result of increased concentrations of the soot, however, the soot may narrow or block the path of the catalyst solution and a gas containing sulfur dioxide and oxygen. Such a trouble in equipment can, however, be prevented by filtering or contrifugalizing a part of the catalyst solution to separate and remove the soot.

The following Examples and Comparative Examples illustrate the present invention specifically.

EXAMPLE 1

100 cc/min. of air was introduced with stirring into 1 liter of an aqueous solution at 35° C. containing 51 ppm of tetravalent vanadium, 55 ppm of divalent manganese, 5% by weight of sulfuric acid and 1 ppm of pentavalent vanadium, and simultaneously limestone (98% pure) was fed at a rate of 1.75 g/min. By continuing this procedure for 30 minutes, the pH of the solution was adjusted to 4. As a result, the concentration of the tetravalent vanadium was decreased to 14 ppm and the concentration of pentavalent vanadium, to 27 ppm. Thus, by using both oxygen and limestone, 70% of the tetravalent vanadium was converted to pentavalent vanadium.

COMPARATIVE EXAMPLE 1

When Example 1 was repeated except that only air was introduced without the supply of limestone, the concentration of pentavalent vanadium was only 2 ppm even when the introduction of air was continued for one hour.

COMPARATIVE EXAMPLE 2

When Example 1 was repeated except that limestone alone was added without the supply of air, the concentration of pentavalent vanadium was only 2 ppm.

EXAMPLE 2

Slaked lime (96% pure) was add at a rate of 1.2 g/min. to 1 liter of an aqueous solution at 50° C. containing 46 ppm of tetravalent vanadium, 43 ppm of divalent manganese, 6% by weight of sulfuric acid and 1 ppm of pentavalent vanadium, and with stirring, air was simultaneously introduced into the solution at a flow rate of 100 cc/min. By continuing this operation for 40 minutes, the pH of the solution reached 2, and the concentration of tetravalent vanadium decreased to 18 ppm. From the fact that the concentration of pentavalent vanadium increased to 38 ppm, it was found that 80% of the tetravalent vanadium was oxidized to a pentavalent state.

COMPARATIVE EXAMPLE 3

When Example 2 was repeated except that air was fed at a flow rate of 130 cc/min. without the supply of the slaked lime, the concentration of pentavalent vanadium was only 2 ppm.

EXAMPLE 3

14 liters of turbid water containing 75 g of quick lime (97% pure) was added to 1 liter of an aqueous solution at 100° C. containing 450 millimols/liter of tetravalent vanadium and 165 millimols/liter of divalent manganese in the course of 5 minutes, and simultaneously, air was introduced into the solution at a rate of 8 liters/min. As a result, the pH of the solution rose to 9, and the ratio of the concentrations of pentavalent vanadium, tetravalent vanadium and divalent manganese changed from the initial 0:3:1 to 13:19:12. This means that 40% of the tetravalent vanadium was oxidized to a pentavalent state.

COMPARATIVE EXAMPLE 4

Example 3 was repeated except that air was not introduced. As a result, the pH of the solution rose to 9, but pentavalent vanadium was not detected.

EXAMPLE 4

110 g of limestone (96% pure) was added to 1 liter of an aqueous solution containing 450 millimols/liter of tetravalent vanadium and 170 millimols/liter of divalent manganese, and the mixture was stirred at 40° C. to adjust the pH of the solution to 7.1. Then, air was introduced to the solution for 30 minutes at a rate of 5 liters/min. As a result, the concentration of pentavalent vanadium reached 230 millimols/liter.

EXAMPLE 5

A flue gas containing 1590 ppm of sulfur dioxide, 4% of oxygen, 8.9% of carbon dioxide gas and 9.7% by weight of moisture, after removing soot, was cooled to 57° C. and fed to the bottom of a Raschig ring-filled tower (absorption tower) having an inside diameter of 68 cm and a height of 6 m at a flow rate of 1,200 $Nm^3$/hr, and simultaneously, an aqueous solution at 28° C. containing 11 ppm of pentavalent vanadium, 194 ppm of tetravalent vanadium, 115 ppm of divalent manganese and 4% by weight of sulfuric acid was fed to the top of the absorption tower at a rate of 30 $m^3$/hr. The effluent from the bottom of the absorption tower was fed into the bottom of an oxidation tower including 10-staged porous plates and having an inside diameter of 44 cm and a height of 6 m at a rage of 30 $m^3$/hr. Simultaneously, air was introduced to the bottom of the oxidation tower at a flow rate of 21 $m^3$/hr. 99.34% of the effluent from the top of the oxidation tower was recycled to the top of the absorption tower, and the unreacted air flowing out from the top of the oxidation tower was combined with the feed gas (flue gas) to be fed to the bottom of the absorption tower. 0.66% (197 liters/hr) of the effluent from the top of the oxidation tower was fed into a 600-liter neutralizing tank equipped with a stirrer, and slaked line (96% pure) and air were fed into it at a rate of 6.4 Kg/hr and 195 liters/hr, respectively to maintain the pH of the solution in the neutralizing tank at 2 to 4. The was as bubbled in the solution, and then released from the neutralizing tank. The resulting gypsum slurry was withdrawn at a rate of 208 liters/hr, and centrifugally separated to form gypsum. The mother liquor was recovered, and combined with the recycle solution to the top of the absorption tower.

By performing the above operations, the concentration of sulfuric acid in the recycle solution was maintained always at 3.7 to 4.2% for 3 months. The gypsum was produced in an amount of 15.1 Kg to 15.7 Kg per hour, and its impurities were only about 9.6% of adhering water, 19 ppm of vanadium and 13 ppm of manganese. By supplying 0.53 g of vanadium pentoxide and 0.6 g of manganese sulfate (anhydride) per hour, the concentrations of pentavalent vanadium, tetravalent vanadium, and divalent manganese in the recycle solution could be maintained over the period of 3 months at 9–12 ppm, 188–203 ppm, and 99–120 ppm, respectively. The concentration of sulfur dioxide in the desulfurized gas discharged from the absorption tower was maintained at 90 to 99 ppm for 3 months.

COMPARATIVE EXAMPLE 5

Example 5 was repeated except that air was not introduced into the meutralizing tank. As a result, even when 0.53 g of vanadium pentoxide and 0.6 g of manganese sulfate were supplied hourly to the recycle solution, the concentration of pentavalent vanadium decreased gradually, and tetravalent vanadim increased correspondingly. Specifically, after 100 hours from the beginning of recycling, the concentration of pentavalent vanadium was decreased to 3 ppm, and after further 100 hours, to 1 ppm. Although the concentration of sulfuric acid and manganese in the recycle solution could be maintained substantially constant, the concentration of sulfur dioxide in the desulfurized gas increased to 136 ppm after 100 hours from the initiation of recycling, and to 484 ppm after 200 hours. Accordingly, it is clear that by causing slaked lime and air to act on a part (197 liters) of the recycle solution, the desulfurizing effect of the recycle solution become remarkable.

EXAMPLE 6

2,600 g of a combustion residue (carbon 86%, moisture 1%, vanadium 3%, iron 0.4%, nickel 0.8%, copper 360 ppm) of a bottom oil [yield based on crude oil 34% by volume, specific gravity (20/4) 0.99, pour point 32° C., residual carbon 18%, average molecular weight 890, carbon 83.9%, hydrogen 10.4%, sulfur 4.9%, nitrogen 0.34%, penetration (25° C.) more than 300, vanadium 140 ppm, nickel 45 ppm, sodium 42 ppm] resulting from the distillation at reduced pressure of crude oil [occurring in Khafji, specific gravity (20/4) 0.88, viscosity at 50° C. 12 cst, sulfur 3.0 wt.%, nitrogen 0.18%, vanadium 56 ppm, nickel 19 ppm] was washed with 52 liters of water having a pH of 2 to obtain a filtrate containing 2 ppm of pentavalent vanadium, 1,300 ppm of tetravalent vanadium, 27 ppm manganese, 150 ppm of iron, 304 ppm of nickel, and 16 ppm of copper. 10 liters of this filtrate was added to 100 liters of a catalyst solution containing 15 ppm of pentavalent vanadium, 28 ppm of divalent manganese and 10% by weight of sulfuric acid to form a mixed solution containing 14 ppm of vanadium pentavalent vanadium, 120 ppm of tetravalent vanadium, 24 ppm of divalent manganese, 9% by weight of sulfuric acid and 14 ppm of iron. While introducing air at room temperature into the mixed solution at a rate of 1 liter/min. for 60 minutes, slaked lime was added simultaneously to adjust the pH of the solution to 12. Then, the vanadium in the solution was analyzed. It was found that the pentavalent vanadium/tetravalent vanadium ratio was drastically changed from the initial 7/60 to 66/1. It was clear therefore that 99% of vanadium supplied from the combustion residue was initially in the tetravalent state, but after adding the catalyst solution, and introducing air and slaked lime, more than 98% of the tetravalent vanadium could be converted to pentavalent vanadium.

It was also confirmed that the iron content of the catalyst solution so obtained was drastically reduced from 14 ppm to $2 \times 10^{-3}$ ppm. This means that even if iron derived from the combustion residue mixes in the catalyst solution, almost all of the iron is converted into a salt insoluble in the catalyst solution after treatment with the calcium compound and air, and thus removed from the catalyst solution.

COMPARATIVE EXAMPLE 6

Air was introduced into the mixed solution prepared in Example 6 (consisting of the catalyst solution and the extract of the combustion residue and containing 14 ppm of pentavalent vanadium, 120 ppm of tetravalent vanadium, 24 ppm of divalent manganese, 9% by weight of sulfuric acid, and 14 ppm of iron) at a rate of 1 liter/min. for 120 minutes. The concentration of pentavalent vanadium was 14 ppm, and tetravalent vanadium also remained in a concentration of 118 to 120 ppm. This means that even when tetravalent vanadium derived from the combustion residue was added to the catalyst solution and then the solution was treated only with water, it was impossible to achieve the purpose of supplying pentavalent vanadium.

COMPARATIVE EXAMPLE 7

Slaked lime was added to the mixed solution prepared in Example 6 to raise the pH to 12. But, the concentration of pentavalent vanadium remained the same at 14 ppm, and the purpose of supplying pentavalent vanadium was not at all achieved.

EXAMPLE 7

Air was introduced in to 110 liters of the mixed solution prepared in Example 6 (containing 14 ppm of pentavalent vanadium, 120 ppm of tetravalent vanadium, 24 ppm of divalent manganese, 9% by weight of sulfuric acid, and 14 ppm of iron) at a rate of 1 liter/min. for 120 minutes, and simultaneously limestone was added to raise the pH of the solution to 7.2. Then, the vanadium in the solution was anaylzed, and it was found that the ratio of pentavalent vanadium/tetravalent vanadium changed from 7/60 to 27/40. It was clear therefore that 33% of tetravalent vanadium derived from the combustion residue was converted to pentavalent vanadium through the action of air and limestone.

The iron concentration of the catalyst solution so obtained was drastically reduced from the initial 14 ppm to $2 \times 10^{-3}$ ppm.

EXAMPLE 8

A flue gas containing 1,200 ppm of sulfur dioxide, 4% of oxygen, 8.9% of carbon dioxide gas, 9.7% of moisture and 0.13 g/Nm³ of soot (containing 0.9% of vanadium, 0.3% of nickel, 0.05% of iron, and 0.2% of sodium), which had been obtained by burning the residual oil [specific gravity 0.947, viscosity 150 cst (50° C.), pour point 5° C., sulfur content 3.1% by weight, vanadium 27 ppm, nickel 9 ppm] resulting from the distillation at atmospheric pressure of a crude oil occurring in Arabia, was cooled to 57° C. by a spray-type cooling tower, and ¾ of the soot was removed.

The flue gas was fed to the bottom of a Raschig ring-filled tower (absorption tower) having an inside diameter of 88 cm and a height of 6 m at a flow rate of 1970 Nm³/hr, and simultaneously, an aqueous solution at 25° C. contaning 24 ppm of pentavalent vanadium, 172 ppm of tetravalent vanadium, 25 ppm of divalent manganese and 6% by weight of sulfuric acid was fed to the top of the absorption tower at a flow rate of 30 m³/hr. The effluent from the bottom of the absorption tower was fed to the bottom of an oxidation tower including 10-staged porous plates and having an inside diameter of 44 cm and a height of 6 m, and simultaneously air was fed to the bottom of the oxidation tower at a flow rate of 20 m³/hr. 99.47% of the effluent from the top of the oxidation tower was to the top of the absorption tower, and simultaneously, the unreached air flowing out from the top of the oxidation tower was combined with the feed gas (flue gas) to be fed to the bottom of the absorption tower. Furthermore, 0.53% (158 liters/hr) of the effluent from the top of the oxidation tower was fed into a 600-liter neutralizing tank equippd with a stirrer together with 10 Kg/hr of limestone (98% pure) and 197 liters/hr of air at room temperature to maintain the pH value of the solution in the tank always at 2 to 5. Air was bubbled in the solution, and then released from the neutralization tank. The resulting gypsum slurry was withdrawn from the tank at a rate of 165 liters/hr, and centrifugally separated to form gypsum. At the same time, the mother liquor was recovered, and combined with the recycle solution to be fed to the top of the absorption tower.

By performing the above operations, the concentration of sulfuric acid in the recycle solution was maintained at 5.6 to 6.3% for 4 months. The gypsum was produced in an amount of 18.3 Kg to 19.7 Kg per hour, and its impurities were 10% of adhering water, 20 ppm of vanadium, about 3 ppm of manganese, and 10 to 3,700 ppm of soot.

The amounts of vanadium and manganese to be lost in the gypsum were 0.4 g and 0.05 g per hour respectively. By supplying manganese (0.11 g of manganese sulfate anhydride) in an amount of 0.04 g per hour, the concentrations of pentavalent vanadium, tetravalent vanadium and divalent manganese were maintained at 21–28 ppm, 163–180 ppm, and 23–27 ppm respectively. Thus it was found that 0.4 g of vanadium and 0.01 g of manganese were supplied hourly to the catalyst solution from the soot carried on the flue gas, and therefore, it was unnecessary to supply additional vanadium which is expensive. The soot content of the recycle solution reached 390 ppm at a maximum, and the iron concentration also reached 0.5 ppm at a maximum. But thereafter, there ws hardly any increase or decrease, and all of the soot and iron incorporated in the catalyst solution were discharged out of the recycle system together with gypsum.

The concentration of sulfur dioxide in the desulfurized gas discharged from the absorption tower was maintained at 80 to 98 ppm over the period of 4 months, and the degree of desulfurization was 92 to 93%.

COMPARATIVE EXAMPLE 8

Example 8 was repeated except that the supply of air to the neutralization tank was omitted. As a result, the concentration of pentavalent vanadium in the recycle solution decreased gradually, and after 100 hours from the initiation of recycling, it was reduced to 11 ppm. After 300 hours, it was reduced to 2 ppm. The concentration of sulfur dioxide in the desulfurized gas increased to 99 ppm after 100 hours from the initiation of recycling, and to 440 ppm after 300 hours. Accordingly, it is clear that by supplying vanadium to the recycle solution through the soot, and placing the recycle solution under the action of limestone and air, there were obtained remarkable effects of supplying pentavalent vanadium to the recycle solution and maintaining the desulfurizing activity of the recycle catalyst solution.

EXAMPLE 9

A flue gas containing 1,560 ppm of sulfur dioxide, 4% of oxygen, 10% of carbon dioxide and 9% by weight of moisture was cooled to 58° C. by a cooling tower while removing soot, and fed to the bottom of a Raschig ring-filled tower (absorption tower) having an inside diameter of 68 cm and a height of 6 m at a rate of 1,200 $Nm^3$/hr. Simultaneously, an aqueous solution at 27° C. containing 15 ppm of pentavalent vanadium, 265 ppm of tetravalent vanadium, 14 ppm of divalent manganese and 5% by weight of sulfuric acid was fed to the top of the absorption tower at a rate of 30 $m^3$/hr. The effluent from the bottom of the absorption tower was fed to the bottom of an oxidation tower including 10-staged porous plates and having an inside diameter of 44 cm and a height of 6 m at a rate of 30 $m^3$/hr, and simultaneously, air was fed to the bottom of the oxidation tower at a rate of 20 $m^3$/hr. 99.5% of the effluent from the top of the oxidation tower was recycled to the top of the absorption tower, and the unreaced air flowing from the top of the oxidation tower was combined with the feed gas (flue gas) to be fed to the bottom of the absorption tower. 0.5% (152 liters/hr) of the effluent from the top of the oxidation tower was fed into a 600-liter neutralization tank equipped with a stirrer, and simultaneously, 4.6 Kg/hr of limestone (96% pure) and 135 liters/hr of air were also fed into the neutralization tank to maintain the pH value of the solution within the tank always at 3 to 5.3. The gypsum slurry formed in the neutralization tank was withdrawn at a rate of 158 liters/hr, and centrifugally separated to form gypsum. The mother liquor was recovered, and combined with the recycle solution to be fed to the top of the absorption tower.

By performing the above operations, the concentration of sulfuric acid in the recycle solution was maintained at 4.7 to 5.3% by weight. The gypsum was produced in an amount of 14.5 to 15.3 Kg per hour, and its impurities were only 11% of adhering water, 26 ppm of vanadium and about 2 ppm of manganese. In view of the fact that 0.4 g vanadium and 0.025 g of manganese were discharged per hour by mixing in the gypsum, the following operation was also performed from the start.

2,600 g (about 7 liters) of a combustion residlue (carbon 86.8%, vanadium 0.69% by weight, manganese 0.03% by weight, copper 0.01% by weight, lead 0.012% by weight) remaining in a combustion furnace after burning a residual oil [yield 56.5% by volume, specific gravity (20/4) 0.900, viscosity (50° C) 250 cst, pour point 50° C., sulfur content 0.15% by weight, nitrogen content 0.10% by weight, vanadium 3 ppm, nickel 30 ppm] resulting from the distillation at atmospheric pressure of a crude oil occurring in Smatra [specific gravity (20/4) 0.848, viscosity (50 C.) 10 cst, sulfur content 0.1% by weight, nitrogen content 0.05% by weight, vanadium 2 ppm, nickel 13 ppm] was immersed in 6 liters of 1.5% by weight sulfuric acid at room temperature for 6 hours. Subsequent filtration afforded a green semi-transparent filtrate containing 2,500 ppm of tetravalent vanadium, 7,400 ppm of iron, 300 ppm of nickel, 70 ppm of divalent manganese, 20 ppm of aluminum, 12 ppm of silicon, 4 ppm of lead, and 11 ppm of copper. No pentavalent vanadium was detected in this filtrate. But since it contained tetravalent vanadium and divalent manganese, this filtrate was used for the make-up of the components of the catalyst solution. That is to say, the recycle solution flowing out from the top of the oxidation tower was combined with 170 cc/hr of this filtrate, and 0.011 g/hr (0.03 g/hr as anhydrous manganese sulfate) was added to it. As a result, the concentrations of pentavalent vanadium, tetravalent vanadium and divalent manganese were maintained at 13–16 ppm, 258–269 ppm, and 10–16 ppm, respectively over the period of 3 months. Thus, it was confirmed that all the amount of vanadium lost in the gypsum and half the amount of the manganese loss were made up for by the aqueous solution in which the combustion residue was immersed.

The concentration of sulfur dioxide in the desulfurized gas discharged from the absorption tower was maintained at 90 to 99 ppm over the period of 3 months.

EXAMPLE 10

A flue gas containing 1900 ppm of sulfur dioxide, 5% of oxygen, 9.2% of carbon dioxide, 10% of moisture and 0.1 $g/Nm^3$ of soot (containing 2.1% of vanadium and 0.7% of nickel) resulting from the combustion of a residual oil [specific gravity 0.985, viscosity 2,000 cst (50° C.), pour point 10° C., sulfur content 4.3% by weight, vanadium 82 ppm, nickel 28 ppm] obtained by the distillation at atmospheric pressure of a Khafji oil was cooled to 57° C. by a spray-tupe cooling tower while removing about 82% of the soot. Then, the flue gas was fed to the bottom of a Raschig ring-filled tower (absorption tower) having an inside diameter of 68 cm and a height of 6 m at a rate of 1,000 $Nm^3$/hr, and simultaneously, an aqueous solution at 28° C. containing 11 ppm of pentavalent vanadium, 194 ppm of tetravalent vanadium, 25 ppm of divalent manganese and 4% by weight of sulfuric acid was fed to the top of the absorption tower at a rate of 30 $m^3$/hr. The effluent from The bottom of the absorption tower was fed into the bottom of an oxidation tower including 10-staged porous plates and having an inside diameter of 44 cm and a height of 6 m at a rate of 30 $m^3$/hr, and simultaneously, air was fed to the bottom of the oxidation tower at a rate of 21 $m^3$/hr. 99.34% of the effluent from the top of the oxidation tower was recycled to the top of the absorption tower, and the unreacted air flowing out from the top of the oxidation tower was combined with the feed gas (flue gas) to be fed to the bottom of the absorption tower. 0.66% (197 liters/hr) of the effluent from the top of the oxidation tower was fed into a 600-liter neutralizing tank equipped with a stirrer, and 6.8 Kg/hr of slaked lime (96% pure) and 129 liters/hr of air were fed into the tank to maintain the pH of the solution within the tank at 6 to 11. Air was bubbled in the solution, and then released from the neutralization tank. The resulting gypsum slurry was withdrawn at a rate of 208 liters/hr, and centrifugally separated to obtain gypsum. Simultaneously, the mother liquor was recovered, and combined with the recycle solution to be fed to the top of the absorption tower. Gypsum was washed with a small amount (30 liters) of the recycle solution, and then again centrifugally separated. The wash liquid was recovered, and combined with the recycle solution to be fed to the top of the absorption tower.

By performing the above operations, the concentration of sulfuric acid in the recycle solution was maintained always at 3.7 to 4.2% for 3 months. Gypsum was produced in an amount of 15 Kg to 15.5 Kg per hour, and its impurities were only about 9.5% of adhering water, 19 ppm of vanadium, 3.5 ppm of manganese and 1,200 ppm of the soot. The amounts of vanadium and manganese lost in the gypsum were 0.3 g and 0.05 g respectively per hour, but by supplying manganese in an amount of 0.04 g per hour (0.1 g as manganese sulfate anhydride), the concentrations of pentavalent vanadium, tetravalent vanadium and divalent manganese of the recycle solution were maintained at 8–13 ppm, 186–203 ppm, and 20–28 ppm, respectively. That is to say, since 0.3 g of vanadium and 0.01 g of manganese are supplied hourly to the recycle solution from the soot in the flue gas, it is not necessary to supply expensive vanadium separately. After the soot content of the recycle solution reached 90 ppm, there was no appreciable increase or decrease, and it can be seen that the soot in an amount corresponding to that mixed from the flue gas was discharged out of the recycle system together gypsum.

The concentration of sulfur dioxide in the desulfurized gas discharged from the absorption tower was maintained at 80 to 98 ppm over the period of 3 months, and the degree of desulfurization was 94 to 95%.

EXAMPLE 11

A flue gas containing 1580 ppm of sulfur dioxide, 5.8% of oxygen, 8.7% of carbon dioxide gas and 10% by weight of moisture was cooled to 57° C. while removing soot, and then fed to the bottom of a Raschig ring-filled tower (absorption tower) having an inside diameter of 68 cm and a height of 6 m at a rate of 1,210 m³/hr. Simultaneously, an aqueous solution at 56° C. containing 11 ppm of pentavalent vanadium, 194 ppm of tetravalent vanadium, 58 ppm of divalent manganese, 153 ppm of trivalent iron and 4% by weight of sulfuric acid at a rate of 30 m³/hr. The effluent from the bottom of the absorption tower was fed to the bottom of an oxidation tower including 10-staged porous plates and having an inside diameter of 44 cm and a height of 6 m, and simultaneously air was fed to the bottom of the oxidation tower at a rate of 22 m³/hr. 99.3% of the effluent from the top of the oxidation tower was recycled to the top of the absorption tower, and simultaneously, the unreacted air flowing out from the top of the oxidation tower was combined with the feed gas (flue gas). Furthermore, 1/150 of the effluent from the top of the oxidation tower was fed into a 600-liter neutralizing tank equipped with a stirrer, and simultaneously, 6.4 Kg/hr of slaked lime (97% pure) and 180 liters/hr of air were fed into the neutralizing tank to maintain the pH of the solution in the neutralizing tank at 4 to 6. Air was bubbled in the solution, and then released from the neutralizing tank. The resulting gypsum slurry was withdrawn at a rate of 207 liters/hr, and after adjusting its pH to 2.5, was centrifugally separated to obtain gypsum. At the same time, the mother liquor was recovered, and combined with the recycle solution to be fed to the top of the absorption tower.

By performing the above operations, the concentration of sulfuric acid in the recycle solution was maintained always at 3.8 to 4.2% over the period of 3 months. The gypsum was produced in an amount of 15 Kg to 15.8 Kg per hour, and its impurities were only about 9.7% of adhering water, 19 ppm of vanadium, 6 ppm of manganese and 17 ppm of iron.

0.53 g of vanadium pentoxide, 0.3 g of manganese sulfate (anhydride) and 0.3 g of metallic iron were added hourly to the catalyst solution to be regenerated, prior to the neutralization step. As a result, the concentrations of pentavalent vanadium, tetravalent vanadium, divalent manganese and trivalent iron of the recycle solution were maintained at 9–12 ppm, 188–203 ppm, 54–61 ppm, and 148–159 ppm.

The concentration of sulfur dioxide in the desulfurized gas discharged from the absorption tower was maintained at 90 to 96 ppm over the period of 3 months.

What we claim is:

1. A process for removing sulfur dioxide from a gas stream containing the same prior to passing said gas stream to the ambient atmosphere comprising oxidizing the sulfur dioxide with an oxygen-containing gas in a low temperature, liquid phase catalytic reaction to produce sulfuric acid wherein said reaction between sulfur dioxide and oxygen is carried out in the presence of an acidic aqueous solution containing, as oxidation catalyst, at least 3ppm each of pentavalent vanadium ion and divalent manganese ion and regenerating and recycling the oxidation catalyst by the steps of:

adding at least one calcium compound selected from the group consisting of calcium oxide, calcium hydroxide and calcium carbonate and an oxygen-containing gas as an oxidizing agent to at least a part of the aqueous catalyst solution used in the oxidation reaction and containing sulfuric acid to thereby oxidize tetravalent vanadium contained therein to pentavalent vanadium and convert sulfuric acid to gypsum, by first adding the calcium compound to the aqueous catalyst solution and thereafter adding the oxygen-containing gas to the aqueous catalyst solution wherein the amount of calcium compound added is sufficient to maintain the pH of the aqueous catalyst solution at at least 7.0, separating the resulting gypsum, and recycling the recovered aqueous solution catalyst for use in the oxidation of sulfur dioxide.

2. The method of claim 1 wherein the concentration of pentavalent vanadium in the aqueous solution catalyst is 3 to 8,000 ppm, and the concentration of divalent manganese is 3 to 200 ppm.

3. The methos of claim 1 wherein at least 3 ppm of trivalent iron is caused to be present in the aqueous solution catalyst.

4. The method of claim 1 wherein soot is added to the aqueous solution catalyst prior to the oxidation reaction of sulfur dioxide.

5. A process for removing sulfur dioxide from a gas stream containing the same prior to passing said gas stream to the ambient atmosphere comprising oxidizing the sulfur dioxide with an oxygen-containing gas in a low temperature, liquid phase catalytic reaction to produce sulfuric acid wherein said reaction between sulfur dioxide and oxygen is carried out in the presence of an acidic aqueous solution containing, as oxidation catalyst, at least 3 ppm each of pentavalent vanadium ion and divalent manganese ion, and regenerating and recycling the oxidation catalyst by the steps of:

adding at least one calcium compound selected from the group consisting of calcium oxide, calcium hydroxide and calcium carbonate and an oxygen-containing gas as an oxidizing agent to at least a part of the aqueous catalyst solution used in the oxidation reaction and containing sulfuric acid to thereby oxidize tetravalent vanadium contained therein to pentavalent vanadium and convert sulfuric acid to gypsum, by simultaneously adding the calcium compound and the oxygen-containing gas to the aqueous catalyst solution wherein the amount of the calcium compound is sufficient to maintain the pH of the aqueous catalyst solution at at least 2.0, separating the resulting gypsum, and recycling the recovered aqueous solution catalyst for use in the oxidation of dioxide.

6. The method of claim 5 wherein the concentration of pentavalent manganese in the aqueous solution catalyst is 3 to 8,000 ppm, and the concentration of divalent vanadium is 3 to 200 ppm.

7. The method of claim 5 wherein at least 3 ppm of trivalent iron is caused to be present in the aqueous solution catalyst.

8. The method of claim 5 wherein soot is added to the aqueous solution catalyst prior to the oxidation reaction of sulfur dioxide.

9. A method for regenerating an oxidation catalyst comprising an acidic aqueous solution of pentavalent vanadium divalent manganese and sulfuric acid and having an initial pH of less than 7.0 in which at least a portion of the pentavalent vanadium has been converted to tetravalent vanadium, comprising adding at least one calcium compound selected from the group consisting of calcium oxide, calcium hydroxide and calcium carbonate and an oxygen-containing gas as an oxidizing agent to at least a part of the acidic aqueous catalyst solution used in an oxidation reaction to thereby oxidize tetravalent vanadium contained therein to pentavalent vanadium and convert sulfuric acid to gypsum by first adding the calcium compound to the aqueous catalyst solution and thereafter adding the oxygen-containing gas to the aqueous catalyst solution wherein the amount of calcium compound added is sufficient to mainain the pH of the aqueous catalyst solution at at least 7.0, and separating the resulting gypsum.

10. A method for regenerating an oxidation catalyst comprising an acidic aqueous solution of pentavalent vanadium, divalent manganese and sulfuric acid and having an initial pH of less than 2.0 in which at least a portion of the pentavalent vanadium has been converted to tetravalent vanadium, comprising adding at least one calcium compound selected from the group consisting of calcium oxide, calcium hydroxide and calcium carbonate and an oxygen-containing gas as an oxidizing agent to at least a part of the acidic aqueous catalyst solution used in an oxidation reaction to thereby oxidize tetravalent vanadium contained therein to pentavalent vanadium and convert sulfuric acid to gypsum by simultaneously adding the calcium compound and the oxygen-containing gas to the aqueous catalyst solution wherein the amount of the calcium compound is sufficient to maintain the pH of the aqueous catalyst solution at at least 2.0, and separating the resulting gypsum.

* * * * *

UNITED STATES PATENT AND TRADEMARK OFFICE
CERTIFICATE OF CORRECTION

PATENT NO. : 4,101,635
DATED : July 18, 1978
INVENTOR(S) : NAMBU, ET AL.

It is certified that error appears in the above-identified patent and that said Letters Patent are hereby corrected as shown below:

Claim 6, line 19, delete "manganese" and insert-- vanadium--

Claim 6, line 21, delete "vanadium" and insert-- manganese--

Signed and Sealed this

Twenty-seventh Day of February 1979

[SEAL]

Attest:

RUTH C. MASON
Attesting Officer

DONALD W. BANNER
Commissioner of Patents and Trademarks